United States Patent [19]

Arditty et al.

[11] Patent Number: 4,868,551
[45] Date of Patent: Sep. 19, 1989

[54] SENSITIVE DISPLAY DEVICE COMPRISING A SCANNED SCREEN

[75] Inventors: Hervé Arditty, Marly le Roi; Claude Puech, Longjumeau, both of France

[73] Assignee: Thomson-CSF, Paris, France

[21] Appl. No.: 18,731

[22] Filed: Feb. 24, 1987

Related U.S. Application Data

[63] Continuation of Ser. No. 664,864, Oct. 25, 1984, abandoned.

[30] Foreign Application Priority Data

Oct. 28, 1983 [FR] France ................ 83 17319

[51] Int. Cl.⁴ .............................. G09G 3/00
[52] U.S. Cl. .............................. 340/712; 340/706; 250/221
[58] Field of Search ............ 340/706, 712, 365 P; 178/18; 250/221; 341/31

[56] References Cited

U.S. PATENT DOCUMENTS

| | | | |
|---|---|---|---|
| 3,673,327 | 6/1972 | Johnson et al. | 340/365 P |
| 3,845,826 | 11/1974 | Mueller. | |
| 3,847,262 | 11/1974 | Higgins. | |
| 4,305,071 | 12/1981 | Bell et al. | 340/712 |
| 4,346,376 | 8/1982 | Mallas | 340/712 |
| 4,459,476 | 7/1984 | Weissmueller et al. | 340/712 |
| 4,484,179 | 11/1984 | Kasday | 340/712 |
| 4,521,771 | 6/1985 | Alton | 340/712 |
| 4,542,375 | 9/1985 | Alles et al. | 340/712 |

FOREIGN PATENT DOCUMENTS 2074428 10/1981 United Kingdom.

OTHER PUBLICATIONS

IBM Technical Disclosure Bulletin, vol. 11, No. 10, Mar. 1969, New York, D. D. Bauman et al., "Optical Data Input Device", pp. 1281-1282.
IBM Technical Disclosure Bulletin, vol. 24, No. 6, Nov. 1981, New York, R. H. Harris, "Optical Overlay Input Device for a Cathode Ray Tube", pp. 2732-2733.

Primary Examiner—David K. Moore
Assistant Examiner—M. Fatahi Yar
Attorney, Agent, or Firm—Olbon, Spivak, McClelland, Maier & Neustadt

[57] ABSTRACT

The sensitive display device of the invention comprises a scanned screen in front of which is situated a plate of transparent material; a detector being coupled with the edge of this plate and a specific position on this plate being determined by contact of a diffusing object, such as a finger. The detector picks up a signal which, after processing, enables the position of this point of contact to be determined. The invention may be used, in particular, as an interface between a computer and a user.

9 Claims, 5 Drawing Sheets

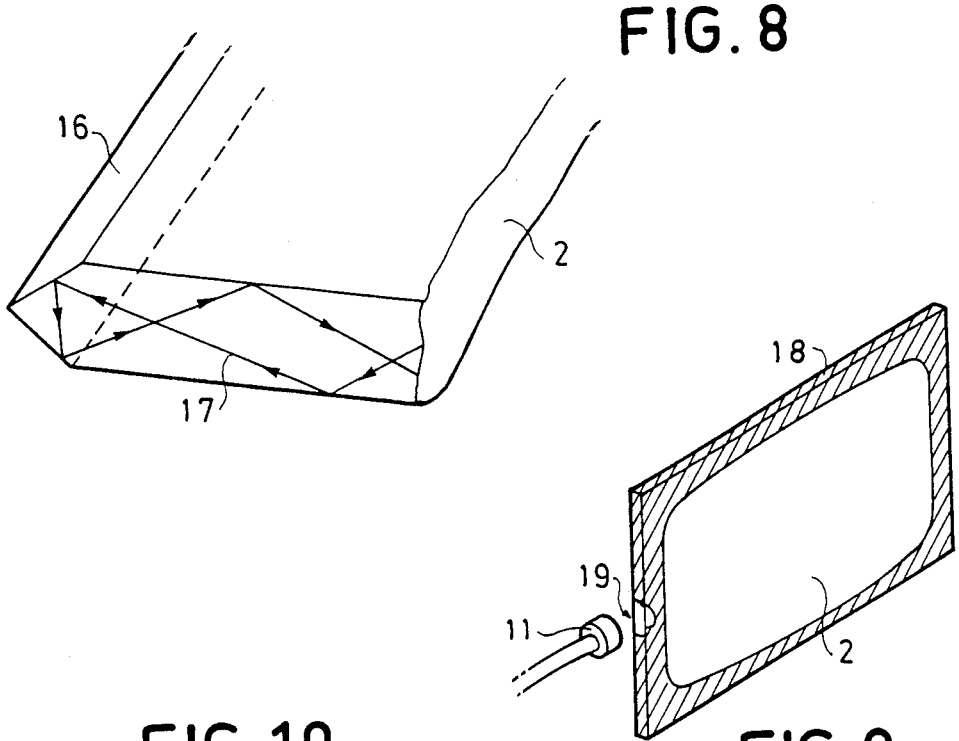
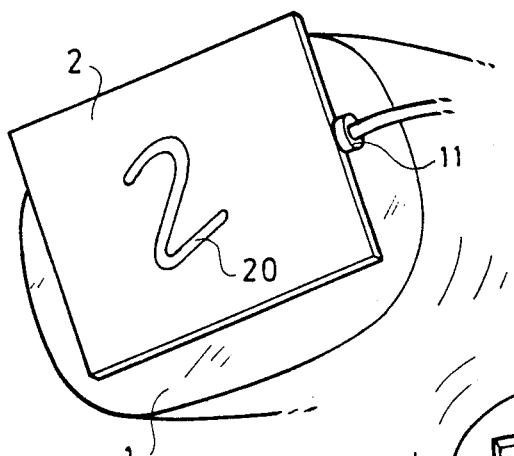
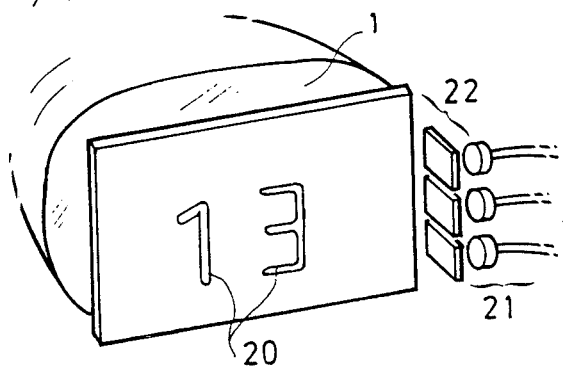

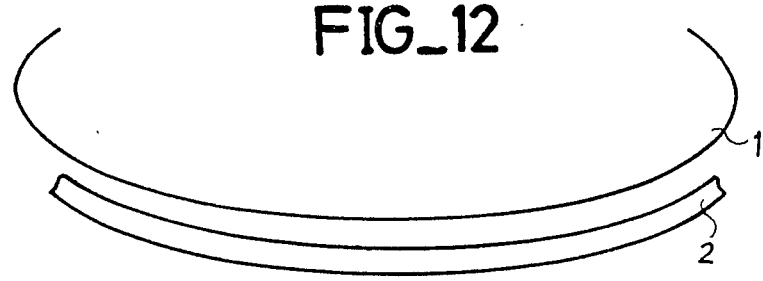
FIG_12
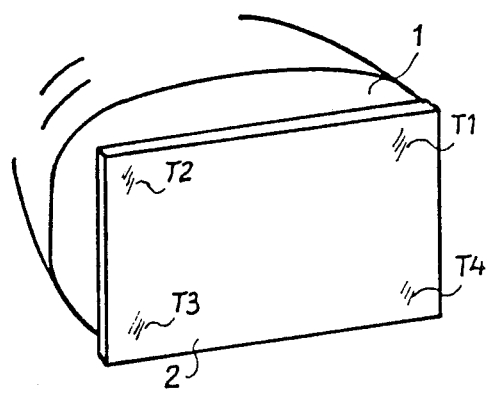
FIG_13
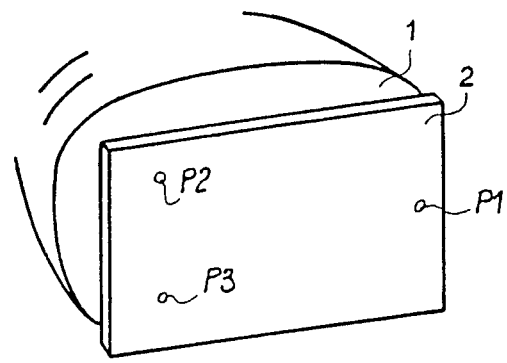
FIG_14
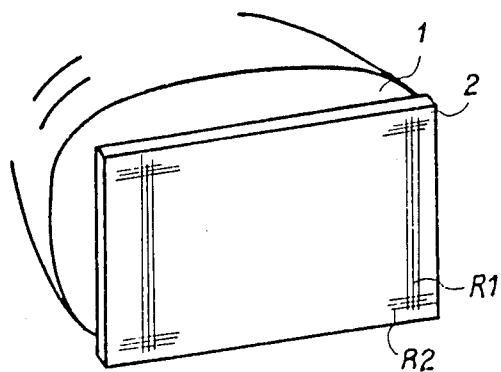
FIG_15

SENSITIVE DISPLAY DEVICE COMPRISING A SCANNED SCREEN

This application is a continuation of application Ser. No. 664,864, filed on Oct. 25, 1984, now abandoned.

BACKGROUND OF THE INVENTION

The invention has as its object a sensitive display device comprising a scanned screen.

A scanned cathode-ray tube of the television type is by far the most widely applied output interface between a computer and a user. The corresponding input interface is almost always a keyboard of the "typewriter" kind for general applications, merely comprising a few push-buttons for some particular applications. This input interface frequently represents a bottleneck, firstly because it demands constant attention from an untrained operator, which distracts them from the screen, secondly because it has but little flexibility and does not permit an easy reconfiguration as a function of the application, and finally because its cost and its lack of reliability tend to cause a considerable lessening of sales expectations for the greater number of its applications.

In order to eliminate these shortcomings, a number of devices have been proposed which enable the operator to point at a particular spot on the cathode-ray screen in reply to a question or to indicate, for example, a selection from a menu.

The best known is the photostylus or "light-pen" where a probe, held by the operator, containing an optical system and a phototdector and connected via the appropriate electronic linkages to the computer, indicates to the latter the position on the screen at which it is aimed by means of the relative phase of a peak corresponding to the passage of the light spot it detects with respect to the scanning sequence. This is the most efficient system since it is exceedingly simple and permits an excellent resolution (for example $10^4$ dots). It has the disadvantage however of requiring an object to be handled, and brings a definite degree of weakness to the system because of the flexible electrical connection joining it to the terminal.

Two different categories of methods have been proposed to eliminate this disadvantage and which enable an operator to point directly to a position on the screen with a finger:

In the first category, it is the contact or pressure of the finger on a transparent plate interposed between the screen and the observer which is detected, either by conduction (plastics material sheets which bear electrodes in cross-patterned matrix form, or a glass panel coated with a layer of conductive oxide and exploiting a Wheatstone bridge effect), or by variation of the acoustic impedance displayed by the point touched.

In the second category, it is the position of the finger which is detected because it interrupts at least two intersecting light beams, of which one forms part of a vertical grid (for example row of photoemitters situated at the bottom of the screen and row of photodetectors situated at the top of the screen) and the other forms part of a horizontal grid (emitter respectively at the right and left of the screen, for example).

What these systems have in common are a comparatively poor resolution, a comparatively low reliability especially for an operator who is not conversant with the process employed, and an electronic system comprising a great number of components.

The device of the invention enables these disadvantages to be overcome by making use of a plate of a transparent material positioned close to the cathode-ray screen, a photodetector being installed at the edge of this plate.

BRIEF SUMMARY OF THE INVENTION

The invention provides a sensitive display device comprising a scanned screen on which may be displaced a light spot, means for detecting at least one specific aiming point on this screen supplying a signal relating to this position, means for processing this signal, a plane waveguide of transparent material disposed in front of said scanned screen, a diffuser means permitting the aiming effect by contact with said waveguide, the aim detector means comprising detector means coupled to at least one extremity of this waveguide, said plane waveguide integrally transmitting the light emerging from the light spot in the absence of a position being aimed at and trapping this light coming from the light spot when at least one position is being aimed at, by coupling within said guide of the light transmitted via the waveguide as far as the diffusing object and by transmission of this light by successive reflections towards these photodetector means.

BRIEF DESCRIPTION OF THE DRAWINGS

Other features and advantages of the invention will appear from the following description taken with reference to the accompanying drawings, in which:

FIGS. 4 to 11 illustrate different embodiments of the device of the invention., FIG. 12 illustrates an embodiment with a curved plate, FIG. 13 illustrates an embodiment having diffusing areas on the plate, FIG. 14 illustrates an embodiment wherein diffusing points are utilized on the plate, and FIG. 15 illustrates an embodiment where diffusing lines are utilized on the plate.

DETAILED DESCRIPTION OF THE PREFERRED EMBODIMENTS

Figure 1:
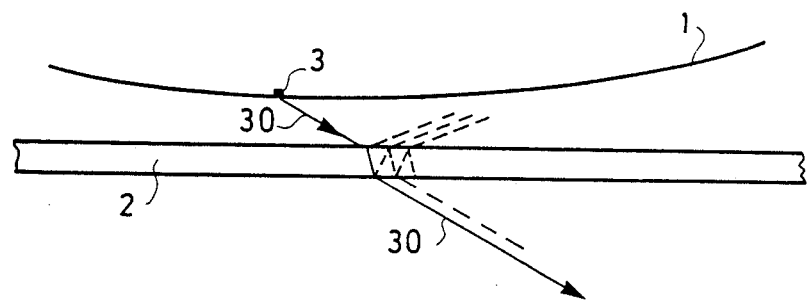
FIGS. 1 and 2 illustrate two views in cross-section of one embodiment of a device according to the invention.

As illustrated in FIG. 1, if a plate 2 of transparent material which obviously has a higher refractive index than that of the ambient air is placed close to a cathode-ray screen 1, the light issuing at a given instant and in a given direction from the scanning light spot 3 passes through this plate 2 without appreciable change. A small loss by Fresnel reflection occurs upon traversal of the first boundary layer (air-material), a refraction moves the beam 30 in question closer to the line normal to the surface at the point of traversal, a second Fresnel reflection of similar magnitude (less than 5% for the greater number of materials) characterises the traversal through the second interface (material-air), and the refraction again moves the beam 30 away from the normal, restoring its direction to one parallel to its original direction if the plate has locally parallel surfaces.

The radiation fraction reflected upon traversing the second interface will undergo propagation within the plate by successive reflections, but since the angle remains constant (still assuming parallel surfaces) it will be attenuated very rapidly since no more than approximately one twentieth of the light is retained after each reflection.

The same applies in respect of the light from the cathodic spot reflected by an object (reflective or diffusive) which is placed close to the screen, as well as of any light coming from an external source.

The edge of the transparent plate is consequently not reached by any light, except for a background level of little importance, if said edge is protected by an opaque frame.

Let us now assume that an object 4 providing a diffuse reflection greater than zero and having a higher refractive index than that of the ambient air, for example a human finger, is placed in localised optical contact with a point of the transparent plate. This object receives an illumination from the cathodic spot which provides a very pronounced maximum if the said spot is positioned right in front of the diffusive object. The diffuse reflection comprises beams within a semi-space delimited by the plate-object interface and directed at the tube 1 through the plate as illustrated in FIG. 2.

These beams may be divided into three categories:
(a) those which are situated within a solid cone 31 centered on the line 32 normal to the interface and having a half-angle at the apex equal to the critical angle for the transparent material-air interface, will act like the beams described in the foregoing and will not reach the edge of the plate 2.
(b) those situated within the solid angle space 33 comprised between the cone having the same axis but of a half-angle equal to the critical angle of the object—transparent material interface (if this angle is real) and $\pi/2$ will not penetrate the plate and will be returned to illuminate the diffusing object.
(c) finally, those situated within the hollow cone 7 having the same axis of which the internal half-angle is the critical angle of the transparent material-air interface and of which the external half-angle is the critical angle of the diffusing object—transparent material interface (if this angle is real, $\pi/2$ if it is not) are in the state of total internal reflection with respect to the opposed surface of the transparent plate, and unless the point of origin is placed too far within the optical contact surface, the same will apply in respect of the successive reflections off both surfaces of the plate.

The majority of the beams forming part of the third group are consequently trapped within the plate 2 and guided by the latter, with no other attenuation than absorption by the material or diffusions on internal or superficial defects, until one of the edges of this plate is reached.

Figure 2:
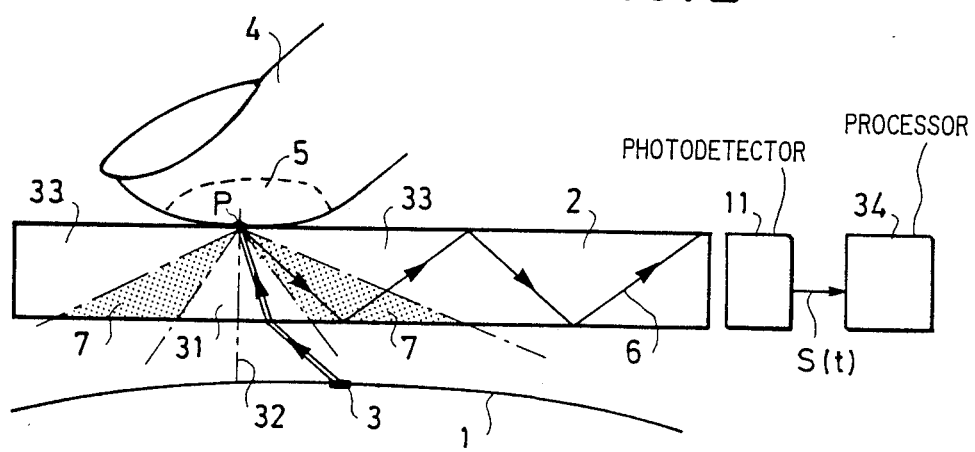

The example of a beam 6 of this kind is given in FIG. 2. The photodetector 11 coupled to the edge of the plate 2 makes it possible to detect beams of this kind. It supplies a signal S(t) transmitted via processing means which render it possible to ascertain the position of the contact point P.

Figure 3:
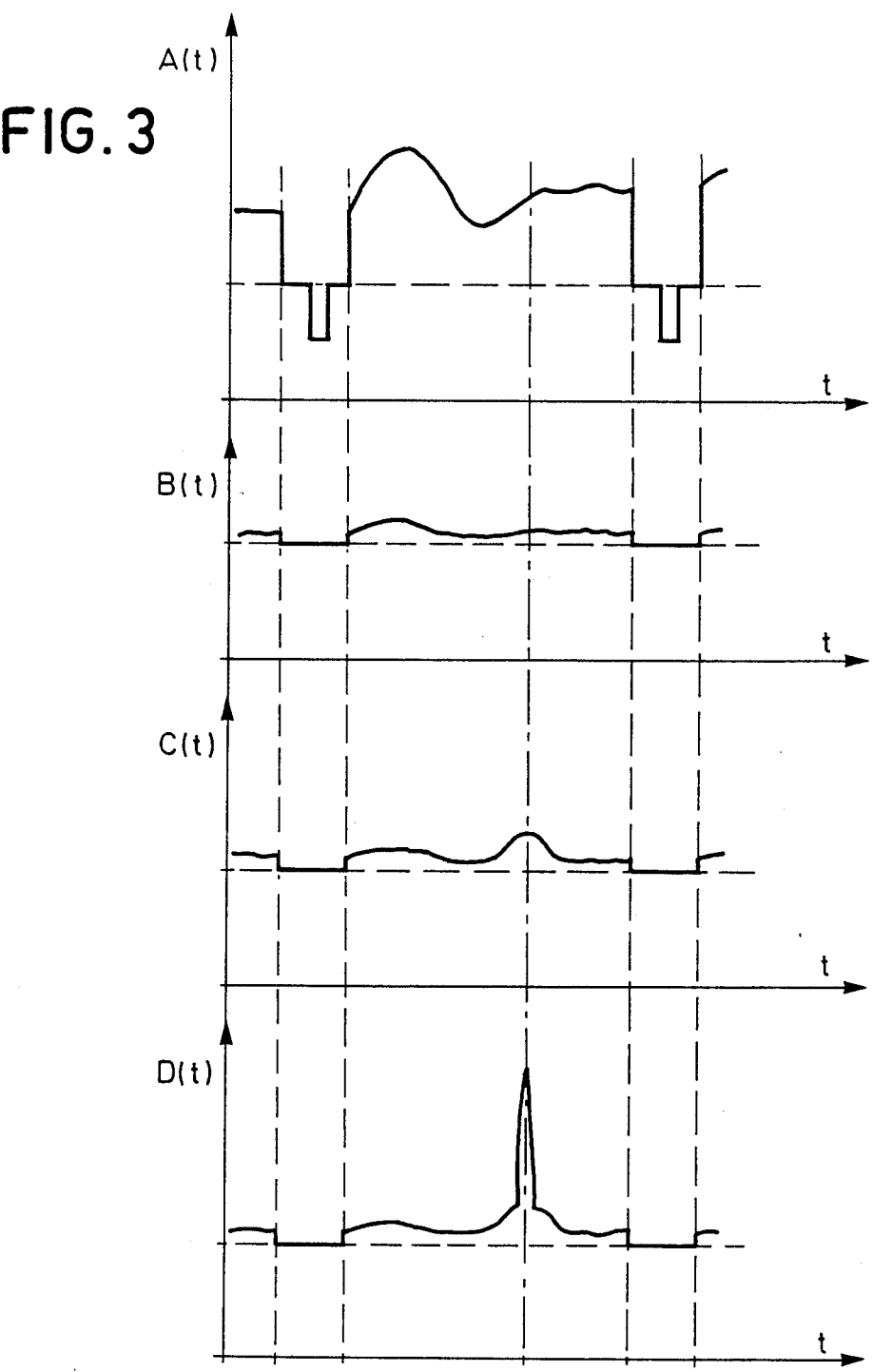
FIG. 3 illustrates different curves explaining the operation of the device of the invention.

FIG. 3 depicts different signals obtained by means of the device of the invention. The signal A(t) represents a video line. If a photodetector is placed before one of the edges of the transparent plate 2, and in the absence of any diffusing object, the detector receives a very small quantity only of light; of which a proportion derives from the video part applied to the cathode-ray tube and of which a smaller fraction derives from the ambient illumination. The signal B(t) consequently represents the background level in the absence of a diffusing object.

If a diffusing object of small size, for example the extremity of an object, is brought close to the plate without making contact with the same, it is only a very small hump which appears superposed over the weak signal detected (this signal may however be exploited if required), and the detected signal C(t) is then obtained.

If, by contrast, the diffusing object comes into local optical contact with the plate, either because it is damp or because it is formed from a substance sufficiently soft to mould itself closely to the surface of the plate whilst displacing the interstitial air, a very sizable peak appears in the temporal optical signal received by the photodetector. The signal D(t) obtained has the same general characteristics as that received by means of a light-pen recalled in the foregoing and consequently for its part permits the determination of the position of the point indicated, by comparison of the relative phase of the peak to that of the video scan. It is also possible to consider several points defined by optical contact with the plate (2).

This collected signal D(t) has a comparatively low degree of resolution, caused by both the absence of a focussing optical system and the size of the finger which may be applied as an indicator. However, it offers two advantages of great interest:
  the signal in question comprises in unequivocal form the information of effective contact which establishes a validation of the indicative intention, and this without additional contact,
  furthermore, the same function is primarily accomplished without handling any external object and as far as the operator is concerned, the terminal equipped in this manner and of which the transparent plate may equally fulfil the task of protecting the tube or may even form part of the same, does not differ in any way from a conventional television monitor.

The unequalled simplicity, reliability and ease of application of the devices produced in this manner, turn the same into a "man-machine" interface of particularly high efficiency.

A number of modified forms of the device of the invention may be employed to improve reliability of detection in difficult cases (optical contact point very far from the photodetector, dark image area, . . . ).

The transparent plate guides the captured light fraction as far as its edges without any preferential direction. This light itself being emitted generally in more or less isotropic manner, its distribution over the perimeter of the plate is approximately uniform. A single monolithic detector receives no more than a small fraction of this radiation even if it has an ideal shape (meaning a width exceeding or equal to the thickness of the plate, and the greatest feasible length) and is placed in actual contact with the edge.

A much higher collection efficiency is secured if several detectors are situated at different points of the plate perimeter. Their positioning may be optimised in a manner such that when, because of the position indicated, one of these operates in unfavourable conditions (for example "fringe" illumination) at least one other is in acceptable conditions (close to the spot and in front of the same).

The limiting case is that of a flexible strip or mouldable strip which is sensitive to light and applied over the whole or part of the periphery of the screen.

Figure 4:
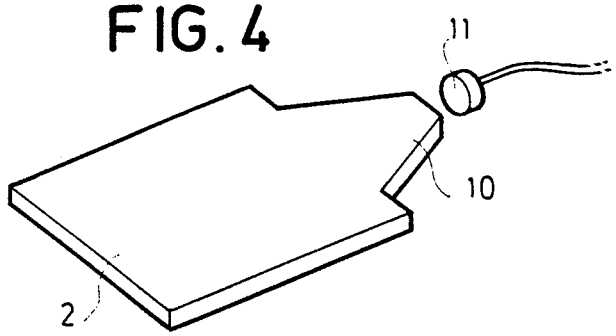
Figure 5:
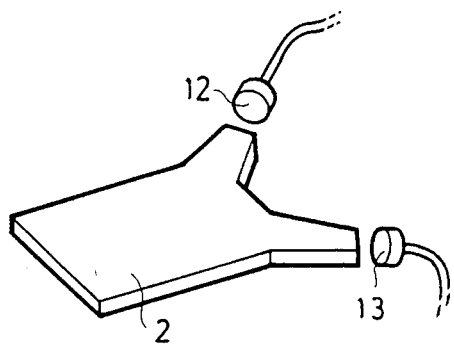

The light collection efficiency may equally be improved by interposing a concentrating or focussing optical system between the plate edge and the sensing surface of the photodetector. This concentrator may advantageously comprise a modification 10 of the actual shape of the plate 2, in the form of a corner having two or three dimensions, as illustrated in FIG. 4. This function may be performed by the corners of the plate without a substantial increase of the bulk of the whole, as illustrated in FIG. 5.

Figure 6:
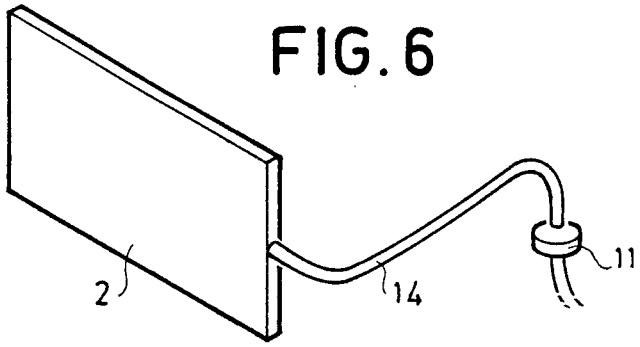
Figure 7:
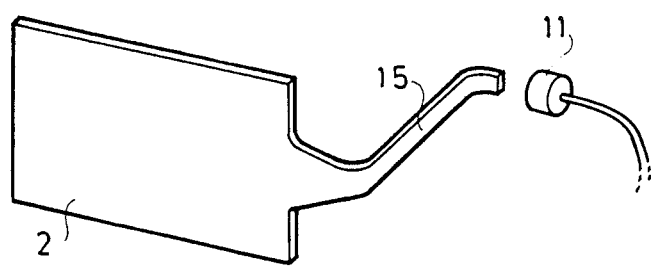

One or more waveguides 14 may be interposed between the edge of the screen 2 and the one or more photodetectors 11, in such a manner that these latter may be placed close to the electronic detection means. This guide may comprise a possibly curved rod of transparent material consisting of a bundle of optical fibres or of a single fibre as illustrated in FIG. 6. It may assume the form of a cone so that it may equally act as a concentrator. Finally, the guide may be formed by an extension 15 of the screen itself, for example formed by cutting out or drawing out as illustrated in FIG. 7.

The collection efficiency of the one or more photodetectors utilised is increased considerably if the surface of the plate edge which is not directly opposite the detectors reflects the light into the plate by maintaining an angle corresponding to total internal reflection for each beam. This may be secured by depositing a reflective coating on the plate edge, or by placing the edge in contact with a reflective material, or else by machining the edge in a bevelled form 16 in such a manner as to establish total internal reflection in the dihedron thus formed, as illustrated in FIG. 8. In the case of the coating or of the reflective material, it may be advantageous to extend the surface area covered to the areas 18 of the surfaces of the plate directly adjacent to the edge, in order to reduce the effect of the light guided towards the detector by refraction and Fresnel reflection, as illustrated in FIG. 9.

The fastenings securing the plate to the frame protecting the said edge may prove to be traps absorbing a substantial part of the light guided by the plate. If the contact points are reflective, they represent permanent points of entry for the ambient light and for that emerging from the cathode-ray tube. If they are absorptive, the trap effect may be increased substantially. One solution consists in coating the areas in question of the plate with a small thickness of a transparent material having a lower refractive index than that of the plate, which plays a light confining role with respect to the said plate. Another and more easily applied solution consists in making use, at the contact points, of a non-reflective material not susceptible to establish an optical contact with the plate. Black velvet fills the bill perfectly.

The application of anti-reflection coatings on one or both sides of the plate causes a considerable reduction within the signal of the background level engendered by the ambient light and by that originating from the cathoderay screen. If, on the contrary, it is intended to intensify the contactless approach effect of a diffusing object on the signal, it is possible to make use of layers increasing the Fresnel reflection.

The proximity of the plate to the cathode-ray screen improves the sensitivity and resolution of the device. If the screen is convex, as is frequently the case, for example forming a portion of a sphere or cylinder, the plate may advantageously be curved as well, in such a manner as to minimise the variations of the plate-screen spacing as shown in FIG. 12.

The optical interference signals originating direct from the screen may be utilised by the signal processing electronic means in such a manner as to render the same independent of the synchronising information originating from the electronic sweep system. A particular case consists in creating, by engraving for example diffusing points P1, P2, P3 (FIG. 15), lines or areas T1, T2, T3, T4 (FIG. 13) on the plate, on its surface which is not situated adjacent the screen, which are received as so many permanent temporal data by the signal processing electronic system.

This may be utilised to supply the electronic system of the screen with data enabling the same to undergo automatic setting (focus, linearity, convergence, ...).

The device of the invention may exploit the foregoing effect in order to detect a complex two-dimensional figure and no longer just the position of one point. For example, a drawing 20 made with a wax crayon or a felt-tip pen on the plate will be converted in the presence of sufficiently uniform scanning (not black) to produce an instantaneous signal yielding a complete reproduction of this drawing as illustrated in FIG. 10.

In order to obtain information regarding the colour of the drawing 20 for the application above, it may be of interest to make use of a screen providing a wide spectrum (for example white) and to utilise several detectors having different spectral response characteristics, by interposing filters 22 for example, as illustrated in FIG. 11. If the object retransmits the light in a different spectrum band (for example fluorescent) it is equally possible to obtain a very satisfactory discrimination in this manner.

A particular application of the foregoing effects is the recognition of shapes or the mensuration of different objects able to be placed in contact or brought right close to the plate. Amongst the possible applications may be cited recognition and identification by application of a hand (flat palm) or sole, measurement and recognition of flat and damp objects (fish), direct automatic procurement of finger prints, reading codes of the "bar code" type, and printed characters.

It is evident that the invention is applicable primarily to screens of the scanned television cathode-ray tube type. It is nevertheless equally perfectly applicable to all other kinds of scanning, for example to flat screens of the plasma type or to liquid crystal screens. In the case of screens based on a light-diffusing action and not a light emitting action, it is obvious that use may be made of an external light source (placed either in front or behind the screen). If the sole purpose of the device is to obtain the position of the one or more diffusing points, the external light required may be guided by the plate itself or by another plate positioned parallel to the first.

The direct application of the output signal of the device to the "video" input produces a light or dark spot, depending on polarity, which appears to follow the position of the finger. The effect produced is spectacular and may be utilised in the production of very simple simulator or sales promotion devices.

We claim:

1. A sensitive display device comprising:
   a scanned screen;
   means for projecting a light spot onto said scanned screen;

means for detecting the designation of at least one particular position of said screen and for supplying a signal S(t) relating to said position;

means for processing said signal;

a plane light waveguide of transparent material situated in front of said scanned screen;

a diffusing object triggering said designation by contact with said waveguide, wherein said means for detection of said designation comprises at least one photodetector means coupled to at least one extremity of said waveguide wherein said plane waveguide internally transmits the light emerging from said light spot in the absence of said designation of a position and wherein said plane waveguide traps said light coming from said spot upon the occurrence of said designation of at least one position by coupling, within said waveguide, of the light transmitted through the waveguide up to said diffusing object wherein said trapped light is transmitted by successive reflections toward said photodetector means and wherein said plane waveguide is a plate which integrally includes at least one concentrating optical system including a shaped portion in the form of a corner having the same thickness as the rest of said plate which has one of said at least one photodetector coupled to each of said at least one concentrating system wherein each of said at least one concentrating system has an edge coupled to an edge of said plate in order to concentrate said trapped light.

2. A sensitive display device comprising:

a scanned screen;

means for projecting a light spot onto said scanned screen;

means for detecting the designation of at least one particular position of said screen and for supplying a signal S(t) relating to said position;

means for processing said signal;

a plane light waveguide of transparent material situated in front of said scanned screen;

a diffusing object triggering said designation by contact with said waveguide wherein said means for detection of said designation includes at least one photodetector means coupled to at least one extremity of said waveguide wherein said waveguide is a plate and wherein said photodetector means includes at least one photodetector coupled with the edge of said plate and wherein said plate waveguide internally transmits the light emerging from said light spot in the absence of said designation of a position and wherein said plane waveguide traps said light coming from said light spot upon occurrence of said designation of at least one position by coupling, within said waveguide, of the light transmitted through the waveguide up to the diffusing object wherein said transmitted light occurs by successive reflections toward said photodetector means and wherein at least one of said at least one photodetector is coupled with the edge of said plate by means of a plate edge extension wherein said plate edge extension is integral with the rest of said plate and has the same thickness as the rest of said plate and concentrates said transmitted light.

3. A sensitive display device comprising:

a scanned screen;

means for projecting a light spot onto said scanned screen;

means for detecting the designation of at least one particular position of said screen and for supplying a signal S(t) relating to said position;

means for processing said signal output from said means for detecting;

a plane light waveguide of transparent material in the form of a plate having one edge cut in bevelled form in order to concentrate light wherein said plate is situated in front of said scanned screen;

a diffusing object triggering said designation by contact with said waveguide wherein the means for detection of said designation comprises photodetector means coupled to at least one extremity of said waveguide and wherein said plate internally transmits the light emerging from said light spot in the absence of said designation of a position and wherein said plate traps said light coming from said light spot upon occurrence of said designation of at least one position by coupling, within said plate, the light transmitted through said plate up to the diffusing object and wherein said coupled light is transmitted by successive reflections toward said photodetector means.

4. A device according to claim 2, wherein an optical focussing system is situated between the edge of said plate and the sensing surface of each photodetector.

5. A device according to claim 2 wherein a second waveguide is positioned between the edge of the plate and each photodetector.

6. A device according to claim 5, wherein said waveguide comprises a rod of transparent material.

7. A device according to claim 6, wherein said waveguide comprises at least one optical fibre.

8. A device according to claim 2, wherein the plate comprises a reflective coating deposited on its edge.

9. A device according to claim 2, wherein the plate has a common convex shape.

* * * * *